United States Patent
Setty

(10) Patent No.: US 6,912,392 B2
(45) Date of Patent: Jun. 28, 2005

(54) LOAD SHARING IN CELLULAR COMMUNICATION SYSTEM

(75) Inventor: David Setty, Romsey (GB)

(73) Assignee: Roke Manor Research Limited, Romsey (GB)

( * ) Notice: Subject to any disclaimer, the term of this patent is extended or adjusted under 35 U.S.C. 154(b) by 105 days.

(21) Appl. No.: 10/344,476

(22) PCT Filed: Jul. 30, 2001

(86) PCT No.: PCT/EP01/08782

§ 371 (c)(1),
(2), (4) Date: Sep. 11, 2003

(87) PCT Pub. No.: WO02/15618

PCT Pub. Date: Feb. 21, 2002

(65) Prior Publication Data

US 2004/0052365 A1 Mar. 18, 2004

(30) Foreign Application Priority Data

Aug. 16, 2000 (GB) .............................. 0020039

(51) Int. Cl.$^7$ ............................................. H04Q 7/20
(52) U.S. Cl. .................... 455/445; 455/452.1; 455/453; 455/454
(58) Field of Search ................................ 455/403, 405, 455/414.1, 445, 450, 452.1, 452.2, 453–454, 67.11; 379/112.04, 112.05, 112.09, 112.1

(56) References Cited

U.S. PATENT DOCUMENTS

| | | | | |
|---|---|---|---|---|
| 6,084,892 A | * | 7/2000 | Benash et al. | 370/401 |
| 6,122,527 A | * | 9/2000 | Robinson et al. | 455/557 |
| 6,400,946 B1 | * | 6/2002 | Vazvan et al. | 455/432.1 |
| 6,570,855 B1 | * | 5/2003 | Kung et al. | 370/237 |
| 6,678,260 B2 | * | 1/2004 | Proctor, Jr. | 370/335 |
| 6,707,804 B2 | * | 3/2004 | Proctor, Jr. | 370/335 |
| 6,763,248 B1 | * | 7/2004 | Odamura | 455/557 |

FOREIGN PATENT DOCUMENTS

| | | |
|---|---|---|
| GB | 2 313 254 | 11/1997 |
| WO | WO 95/24771 | 9/1995 |
| WO | WO 96/08940 | 3/1996 |
| WO | WO 97/11568 | 3/1997 |
| WO | WO 98/25427 | 6/1998 |
| WO | WO 99/49598 | 9/1999 |
| WO | WO 00/24163 | 4/2000 |

* cited by examiner

Primary Examiner—Binh Tieu
(74) Attorney, Agent, or Firm—Crowell & Moring LLP

(57) ABSTRACT

A cellular communications system comprises a plurality of base stations serving respective system cells, each base station being capable of communicating with a plurality of mobile terminals within its cell and with at least some mobile terminals in adjacent system cells. Where connection of a mobile terminal to one of the base stations demands the downloading of information that, combined with data already being handled by that base station, would place excessive load on the data-handling capability of the base station, the data transmission is shared by that base station and at least one other. By this means, a call requesting the downloading of significant amounts of data, placed by a mobile terminal upon a base station that is already heavily loaded with data transmissions to other mobile terminals, is dealt with in parallel by two or more base stations, so that individual base loading is substantially reduced. It is preferred that the amount of data transmitted to the mobile terminal by each of the base stations involved takes account of the existing load applied to the individual base stations, so that more lightly-used base stations can be made to bear the brunt of the heavy demand from the new mobile terminal. It is also preferred that the data be coordinated by one or more of the base stations in order to ensure its cohesive transmission.

4 Claims, 1 Drawing Sheet

LOAD SHARING IN CELLULAR COMMUNICATION SYSTEM

This invention relates to cellular communication systems, such as mobile telephone systems, which are basically short-range cordless telephony systems, based upon the notional overlaying of a geographic area, representing the system's coverage limits, with a more-or-less regular tessellation of spatial cells, each served by at least one base station which primarily communicates with mobile terminals in its cell, but also communicates with base stations and mobile terminals in adjoining cells to perform various house-keeping activities, such as providing hand-over functions which allow mobiles to move freely from cell to cell.

The demands placed upon such systems are continually increasing, in terns not only of the number of mobiles to be supported, but also of the amounts of data traffic handled per mobile. These latter demands arise at least in part because of major increases in downlink traffic (i.e. data passed from base stations to mobiles) as access to major information centres and databases grows wider. Increased downlink traffic not only presents straightforward capacity problems; it also gives rise to data handling problems associated with the asymmetry between uplink and downlink traffic.

Various expedients have been used to address the problems associated with the above-mentioned demands, and indeed some proposed solutions have involved the use of hybrid systems combining the technologies associated with Frequency Division Duplex (FDD) and Time Division Duplex (TDD), both of which are well established for use with cellular communication systems. Typically, FDD is preferred for operating environments involving communications over relatively large distances, since it is not as susceptible as TDD to round-trip delays and Doppler fading. TDD can be useful, however, in so-called communications "hot-spots", such as offices and public buildings, and it has thus been proposed to include, within certain FDD cells, smaller cells (sometimes referred to as "micro-cells") centred upon communications hot-spots and operating in accordance with TDD principles.

This expedient is effective to a degree. However, the more mobiles that are accommodated by a system, the greater are the difficulties of coping with the sheer volume of data traffic generated. This is particularly the case when a mobile requiring heavy downloading of data connects with a base station whose operational load is already close to its data-handling capacity This invention seeks to address this problem and, according to the invention from one aspect, there is provided a cellular communications system comprising a plurality of base stations serving respective system cells, each base station being capable of communicating with a plurality of mobile terminals within its cell and with at least some mobile terminals in adjacent system cells; wherein connection of a mobile terminal to one of said base stations demanding the downloading of information that, combined with data already being handled by that base station over connections with other mobile terminals, would place excessive load on the data-handling capability of the base station is shared by said base station and at least one other base station capable of communicating with the mobile terminal.

By this means, a call requesting the downloading of significant amounts of data, placed by a mobile terminal upon a base station that is already heavily loaded with data transmissions to other mobile terminals, is dealt with in parallel by two or more base stations, so that individual base loading is substantially reduced.

Preferably, the amount of data transmitted to the mobile terminal by each of the base stations involved takes account of the existing load applied to the individual base stations. By this means, the more lightly-used base station or stations can be made to bear the brunt of the heavy demand from the new mobile terminal.

In order that the invention may be clearly understood and readily carried into effect, one embodiment thereof will now be described, by way of example only, with reference to the accompanying drawings, of which:

Figure 1:
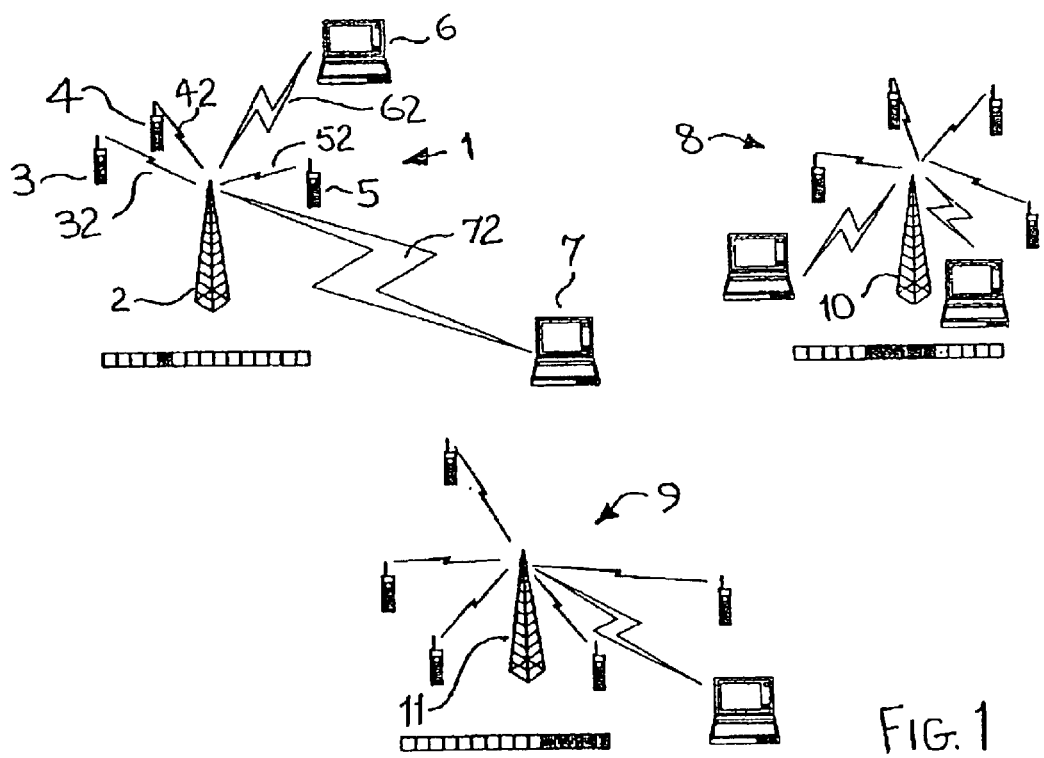
FIG. 1 shows, schematically, the operation of a multi-cellular system.

Referring now to FIG. 1, in which it is assumed that a TDD system employing a DCA algorithm is used, a cell 1 of a cellular communications system is served by a base station 2. The base station 2 primarily transmits down-link data to, and receives up-link data from, a plurality of mobile terminals in its cell. In FIG. 1, three mobile phone terminals, 3, 4 and 5 and two mobile data terminals, 6 and 7, are shown by way of example only, and the intention is that each mobile terminal can communicate independently with the base station 2 over respective paths 32, 42, 52, 62 and 72. Similarly, in adjacent cells 8 and 9 of the system, base stations 10 and 11 respectively communicate with respective groups of mobile phone and mobile data terminals, as shown.

It is assumed-that the base stations 2, 10 and 11 are each using each of the five TDD time slots allocated to them, and that the data being handled within each of the three cells 1, 8 and 9 is nearing capacity before the data terminal 7 attempts to establish connection to the system, via base station 2, at a high data rate. In view of the existing load on the system, capacities may well be exceeded, with the consequence either that the high data rate user 7 has to accept a lower data rate than it requires or other users in that cell and connected at that time to the base station 2 will have to either function on reduced data rate or lose its connection.

In accordance with this embodiment of the invention, however, the high data rate user 7 is able to affiliate with more than one base station. This enables a user requiring, for example, a fast Internet connection or a video conferencing stream to affiliate with (say) three base stations and thus utilise the small capacity remaining in the TDD time slots of all three.

Figure 2:
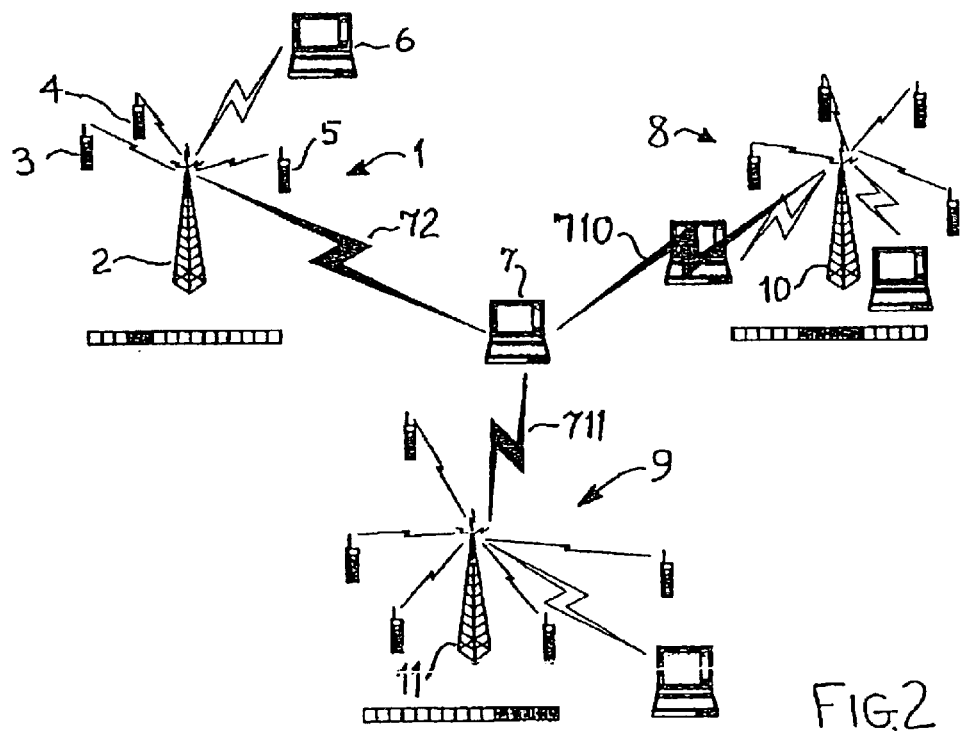
FIG. 2 shows, schematically, a cellular communications system in accordance with one embodiment of the invention.

This is shown schematically in FIG. 2, in which features similar to those in FIG. 1 bear identical reference numerals. As shown, the high rate data user 7 now affiliates over paths 72, 710 and 711 respectively with each of the base stations 2, 10 and 11 and utilises excess capacity in each of the cells 1, 8 and 9. This can take the form of a number of codes in a number of time slots in each of the cells.

By this means the impact on each of the other users is reduced, as the high data rate user no longer impacts upon the resources of a single cell. It is preferred that, when the invention is invoked, the base station 2 normally connecting with the high data rate user 7 is configured to assess whether, in the light of its current data-handling capacity, the impact that the requested connection would have will, or is likely to, cause the problems outlined above to arise.

If so, the base station 2 communicates with one or more of the adjacent base stations 10 and 11 to ascertain their current capacities and, provided they have sufficient spare capacity to assist, enables connections 710 and 711 to be established thereby allowing the user 7 to affiliate with all three base stations and spreading over the three stations the effort needed to meet the high data rate demands of user 7.

It is preferred that the load is spread intelligently, taking into account the capacities available in the three cells, and also that such intelligence be dynamic, thus allowing for changes in the relative capacities, as influenced by new connections and/or disconnections of other users occurring during the connection with user 7.

It is also preferred that the data conveyed over the paths 72, 710 and 711 be co-ordinated by one or more of the base stations in order to ensure cohesive transmission of the data for user 7.

Although the invention has been described herein with respect to particular embodiments, it is not intended to be limited by such description. The principle of a heavily-loaded base station responding to requests from a mobile terminal for high data rate transmissions by facilitating the affiliation of that terminal with at least one other base station may be implemented in other ways that will be evident to those skilled in the art.

What is claimed is:

1. A cellular communications system comprising a plurality of base stations serving respective system cells, each based station being capable of communicating with a plurality of mobile terminals within its cell and with at least some mobile terminals in adjacent system cells; wherein connection of a mobile terminal to one of said base stations demanding the downloading of information that, combined with data already being handled by that base station over connections with other mobile terminals, would place excessive load on the data-handling capability of the base station, is shared by said base station and at least one other base station capable of communicating with the mobile terminal, characterised in that load is spread to take into account changes in relative capacities of said at least one other base station an influenced by new connections and/or disconnections of other users.

2. A system according to claim 1 wherein the amount of data transmitted to the mobile by each of the base stations involved takes account of the existing load applied to the individual base stations.

3. A system according to claim 2 wherein the amount of data transmitted between the mobile terminal and each of the base stations involved takes account of changes in their relative capacities, as influenced by new connections and/or disconnections of other users occurring during the connection with the mobile terminal.

4. A system according to claim 1, wherein the data transmitted to the mobile terminal by each of the base stations involved is co-ordinated by one or more of the base stations in order to ensure cohesive transmission of the data.

* * * * *